United States Patent [19]

Kasemeier et al.

[11] 3,750,550

[45] Aug. 7, 1973

[54] STILL CAMERA WITH AN ELECTRONICALLY CONTROLLED SHUTTER AND A RECEIVER FOR A PHOTO-FLASH DEVICE

[75] Inventors: Rolf Kasemeier, Heuchelheim; Karl Günter Behr, Biebertal, both of Germany

[73] Assignee: Minox GmbH Optische Und Feinmechanische Werke, Postfach, Giessen, Germany

[22] Filed: Oct. 20, 1972

[21] Appl. No.: 299,261

[52] U.S. Cl. .................. 95/11 L, 95/10 CT, 95/53 E
[51] Int. Cl. ......................... G03b 15/03, G03b 9/58
[58] Field of Search ............. 95/11 L, 10 C, 11.5 R, 95/53 E, 11 R, 10 CT

[56] References Cited
UNITED STATES PATENTS
3,633,476   1/1972   Yazaki et al. ........................ 95/11 R
3,318,215   5/1966   Schiks ............................. 95/11.5 R
3,504,602   4/1970   Kiper et al. ........................ 95/10 C

*Primary Examiner*—Robert P. Greiner
*Attorney*—Frederick E. Hane et al.

[57] ABSTRACT

There is disclosed a still camera with an electronically controlled shutter and a receiver for a photo-flash device. The circuit system in the camera controls the opening time of the shutter in accordance with the incident light and includes for this purpose a light-sensitive resistor and a normally closed switch. The photo-flash device includes a resistor and a circuit component which is insertable into the receiver of the camera. Insertion of this circuit component into the camera receiver device disconnects the light-sensitive resistor in the control circuit on the camera and connects instead the resistor on the flash device to the control system of the camera. The resistor on the flash device has a resistance such that the circuit control system on the camera automatically sets the shutter opening time to the optimal shutter opening time for the flash device.

6 Claims, 4 Drawing Figures

STILL CAMERA WITH AN ELECTRONICALLY CONTROLLED SHUTTER AND A RECEIVER FOR A PHOTO-FLASH DEVICE

The present invention relates to a still camera with an electronically controlled shutter and a receiver for a photo-flash device.

BACKGROUND

In camera combinations of the general type above referred to the shutter opening time, that is, the exposure time for film in the camera is controlled by the intensity of the light at the moment a picture is taken.

There are known camera shutters the opening time of which is controlled by an electronic circuit system. The usual arrangement with cameras as used by amateurs is that the shutter opening time is controlled by a photo-sensitive resistor which varies the charging time of a capacitor by changing its electrical resistance as a function of the incident light.

There are also known various types of photo-flash guns, for instance electronic flash guns, flash guns which use flash bulbs, flash guns designed for flash cubes, etc. Such photo-flash guns are coupled with the camera so that the camera shutter as it opens initiates the photo-flash. The minimum time for which the camera shutter must remain open so that the photo-flash reaches its peak illumination, depends not only on the specific characteristics of different shutter types such as focal-plane shutters, iris shutters, etc., but also on the specific characteristics of the photo-flash gun itself and the used flash-generating medium. Different flash media have different peaking times and also different flash time periods.

THE INVENTION

It is a broad object of the invention to provide a novel and improved still camera with an electronically controlled shutter and a receiver for a photo-flash device which permits setting of the camera shutter for any desired opening time within the range for which the shutter is designed and which does not require any components in the camera which are needed only for taking flash pictures.

Another object of the invention is to provide a novel and improved still camera of the kind above referred to which can be conveniently arranged to accommodate photo-flash devices which require other shutter opening times than the presently known flash devices.

Still another object of the invention is to provide a novel and improved still camera of the general kind above referred to which can be conveniently adapted for optimal performance to various types of photo-flash devices by incorporating the required shutter time controlling circuit components directly in the flash device so that no changes in the camera are necessary.

SUMMARY OF THE INVENTION

The aforepointed out objects, features and advantages, and other objects, features and advantages which will be pointed out hereinafter are obtained by providing in the camera an electronic circuit system which controls the shutter opening time by means of a photo-sensitive impedance such as a resistor and providing in the photo-flash device an impedance means such as a resistor having a resistance value selected in accordance with the specific characteristics of the flash device, and by further providing in the flash device a circuit component such as switch contacts which upon attachment of the flash device to the camera disconnect the photo-sensitive resistor in the control circuit of the camera and connect instead the resistor in the flash device to the control circuit on the camera.

The concept of the invention is not limited to changing the resistance included in the control circuit on the camera, but in some cases it is preferable to disconnect the capacitor rather than the resistor and to connect instead a suitably selected capacitor provided for the purpose in the flash device. It is also possible to provide circuit components such as RC networks in the control circuit in the camera and to switch off the RC network in the camera control circuit and to switch in instead a network designed for the optimal shutter opening time required by the flash device to be used with the camera. For instance, a light-sensitive device such as a light-sensitive resistor in the camera may be disconnected and replaced by a light-sensitive sensing means incorporated in an electronic flash gun. The ambient light, for instance daylight, is generally markedly different from the light characteristics of artificial light as is produced by a photo-flash. The photo-sensitive sensing means incorporated in the flash device can be selected in accordance with the specific requirements of the flash to be used and will thus automatically set the shutter of the camera to the optimal opening time for the photo-flash device.

DETAILED DESCRIPTION OF THE INVENTION

In the accompanying drawing, several preferred embodiments of the invention are shown by way of illustration and not by way of limitation.

Figure 1:
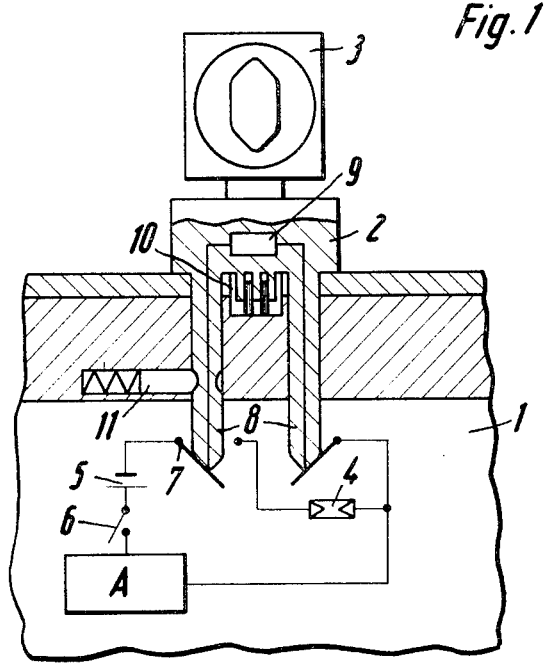
FIG. 1 is a diagrammatic view of a camera of the type referred to with a cube-type photo-flash device attached thereto.

Referring now to the figures more in detail, FIG. 1 shows schematically a camera casing 1 and a photo-flash device 2 releasably attached to a receiving means on the camera. Receivers for photo-flash devices such as flash guns are well known in the art as such, and many types thereof are available. The photo-flash device is shown as being of the type using a so-called flash cube 3.

The camera includes an electronic circuit control system A which includes a photo-sensitive circuit component such as a resistor 4, a battery 5 and a normally closed switch 7. The control circuit system has been laid out for taking daylight pictures or at light substantially equivalent to daylight, such as flood lights. The shutter is operated by a switch 6 generally referred to as a release button provided when the photo-flash device is not attached to the camera and hence switch 7 is closed.

As stated before, FIG. 1 shows the flash device attached to the camera casing; it is releasably held in its attached position by suitable retaining means indicated as a spring-loaded locking pin 11.

The flash device includes an impedance means such as a resistor 9 with substantially constant resistance. The electrical characteristics of resistor 9 are selected in accordance with the type of flash used in the device, that is, so that the shutter opening time when the shutter is operated by switch 6 is the best suitable one for the flash device 3. The flash device further comprises a circuit component 8. This component is shown as comprising two pole elements which functionally constitute switch contacts. There is further provided a contact connector 10 which connects the wiring required for setting off the flash with the power supply on the camera. This wiring is not shown in detail, but is presumed to be conventional. As it is apparent from FIG. 1, application of the flash device to the camera opens switch 7 thereby automatically disconnecting resistor 4 and connecting resistor 9 in the control circuit system on the camera. Accordingly, the shutter opening time is now controlled by resistor 9 rather than by resistor 4. Conversely, removal of the flash device causing closing of switch 7 disconnects resistor 9 and reconnects resistor 4 so that the shutter opening time is now controlled by resistor 4.

Figure 2:
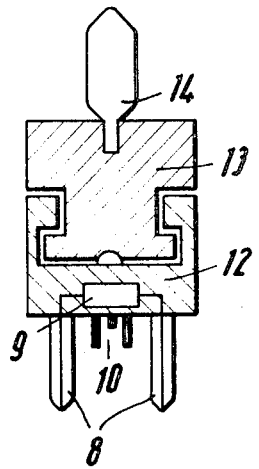
FIG. 2 is an elevational sectional view of an adapter supporting a photo-flash device for attaching the same to a camera.

FIG. 2 shows a photo-flash device 13 combined with an adapter 12. The flash device is shown as being designed for a flash bulb 14. It is releasably connected to the adapter by the generally known and widely used foot-and-shoe connection. The resistor 9 described in connection with FIG. 1 is mounted on the adapter which also mounts the afore-described pole elements 8. The operation of the assembly according to FIG. 2 is apparent from the description of FIG. 1.

Figure 3:
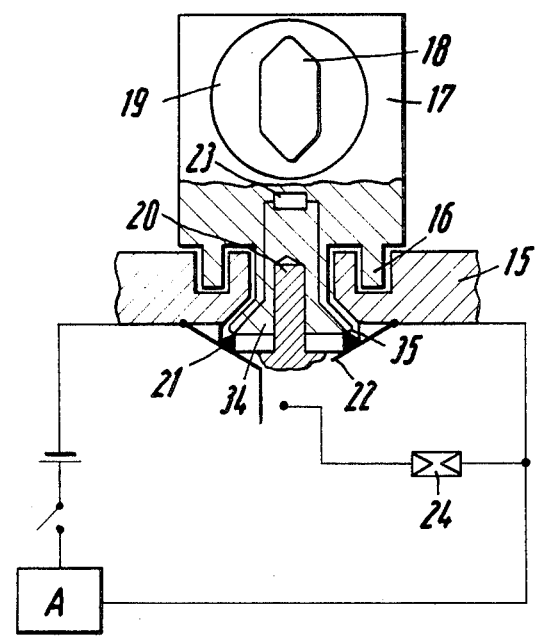
FIG. 3 is a diagrammatic view of a camera with a photo-flash device using a flash cube attached thereto.

The assembly shown in FIG. 3 comprises a camera casing 15, the top side of such includes a socket 16 for rotatably receiving a mount 17 constituting a carrier for several flash bulbs. The carrier is cube-shaped and each of its four sides is designed to receive a flash bulb 18 of the type using combustible flash material such as magnesium wire. A reflector 19 is preferably provided in back of each bulb. The lower part of mount 17 has secured thereto a pinion 34 with a center bore which is rotatable in a correspondingly shaped guide pin 20 on the top side of the camera casing. Pinion 34 mounts four pole shoes 35, one for each of the four flash bulbs 18 on mount 17 for successively placing the bulbs into the position for taking a flash picture by turning mount 17 through successive angles of 90°. As it is apparent, in each of the four operative positions of the mount, the respective pole shoes are in engagement with contact springs 21 and 22 on the camera to open the contacts. As a result, resistor 23 on mount 17, which is similar to resistor 9 described in connection with FIGS. 1 and 2, and dimensioned for matching the opening time requirements of the flash bulbs, is connected in the aforedescribed circuit control system on the camera and photo-sensitive resistor 24 is disconnected. Resistor 24 corresponds to the previously described resistor 4. Upon removal of the flash device from the camera casing 15 contact springs 21 and 22 close thereby disconnecting resistance 23 from the control system of the camera and reconnecting resistor 24, that is, the shutter opening time of the camera is now again controlled by the circuit control system thereof.

Figure 4:
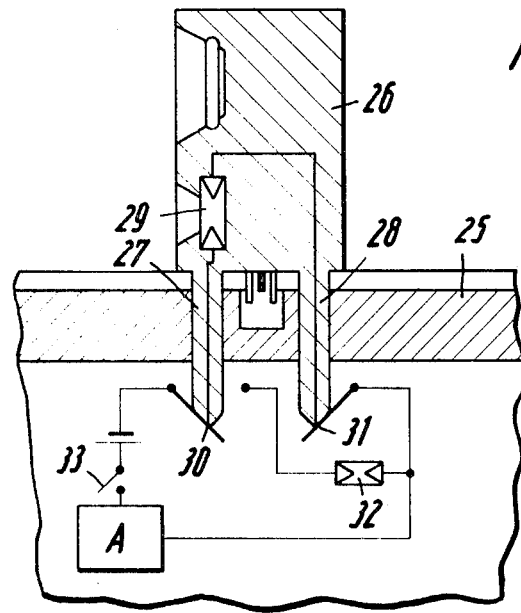
FIG. 4 is a diagrammatic view of a camera with an electronic photo-flash device attached thereto.

According to FIG. 4, pole elements 27 and 28 connect an electronic photo-flash device 26 electrically and mechanically to a casing 25 of the camera. As is shown, the shutter opening time control system of the camera comprises a photo-sensitive impedance means such as a photo-sensitive resistor 32 corresponding to resistor with flash photographs. 4 or 24 as previously described. This resistor is connected to the control circuit via normally closed spring contacts 30 and 31. In the same manner as previously described, pole elements 27 and 28 open these contacts thereby disconnecting resistor 32 and connecting an impedance means 29, functionally corresponding to resistor 9 or 23 on the flash device to the circuit control system on the camera.

As also previously described, resistor 29 should be visualized as a resistor having a constant resistance value preferably so selected that it sets the shutter opening time for the shortest period of time at which the flash produced by the device is at its peak value. As is now evident, the principle used in FIG. 4 is basically the same as described, for instance, in FIG. 1.

Instead of using a fixed resistance value for resistor 29, this resistor can also be in the form of a photo-sensitive resistor which is different from the photo-sensitive resistor 32 on the camera by being set for instance, for the short peaking time of a flash produced by an electronic flash device, or for a field angle which is different from the one generally used in connection with flash photographs.

When the electronic flash device is removed from the camera, the resistor 29 is automatically disconnected from the control circuit system on the camera and resistor 32 is reconnected.

While the invention has been described in detail with respect to certain now preferred examples and embodiments of the invention, it will be understood by those skilled in the art, after understanding the invention, that various changes and modifications may be made without departing from the spirit and scope of the invention, and it is intended therefore, to cover all such changes and modifications in the appended claims.

What is claimed is:

1. A still camera with an electronically controlled shutter and a receiver for a photo-flash device, comprising in combination:
   in the camera, a circuit system controlling the opening time of the shutter and including a light-sensitive circuit component and a normally closed switch means; and
   a photo-flash device including a shutter opening time controlling circuit component and a switching means insertable into the receiver of the camera, insertion of said switching means into the camera receiver disconnecting the light-sensitive circuit component in the control circuit system on the camera and connecting the circuit component on the flash device into said control circuit system, said circuit component on the flash device being correlated with the circuit control system on the camera to set the shutter opening time in accordance with the optimal shutter opening time for the flash device.

2. The still camera according to claim 1 wherein the circuit component included in the circuit system on the camera is a light-sensitive resistor and the circuit component on the photo-flash device is a resistor having a substantially constant resistance.

3. The still camera according to claim 1 wherein said switching means on the photo-flash device comprises pole elements which upon insertion into the receiver on the camera open the normally closed switch means on the camera and simultaneously connect the circuit component on the flash device into the control circuit on the camera.

4. The still camera according to claim 1 wherein said photo-flash device comprises an adapter means insertable into the receiver on the camera, said adapter means including said shutter opening time controlling circuit component and said switching means for opening the switch means on the camera and simultaneously connecting the circuit component on the adapter in the control circuit system of the camera instead of the circuit component included in said system.

5. The still camera according to claim 4 wherein said switching means for opening of the switch means on the camera upon insertion of the adapter means into the receiver comprise pole elements, said pole elements further connecting the circuit component on the adapter in the control circuit system on the camera.

6. The still camera according to claim 1 wherein said photo-flash device comprises a mount for simultaneously mounting several flash bulbs facing in different directions, said mount including said shutter opening time controlling circuit component and being rotatably receivable by the receiver on the camera for placing successive flash bulbs in a selected direction, said mount further including said switching means for simultaneously connecting the circuit component on the mount in the circuit control system on the camera and disconnecting the circuit component in said control system therefrom.

* * * * *